(12) United States Patent
Kong et al.

(10) Patent No.: US 8,831,692 B2
(45) Date of Patent: Sep. 9, 2014

(54) PROTECTIVE GASKET FOR DISPLAY MODULE OF PORTABLE ELECTRONIC DEVICE AND METHOD FOR ASSEMBLING THE DEVICE

(75) Inventors: Zhenyu Kong, Beijing (CN); Yiya Qian, Beijing (CN)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 866 days.

(21) Appl. No.: 12/860,057

(22) Filed: Aug. 20, 2010

(65) Prior Publication Data

US 2011/0244930 A1    Oct. 6, 2011

(30) Foreign Application Priority Data

Mar. 31, 2010   (CN) .......................... 2010 1 0138958

(51) Int. Cl.
*G02F 1/1333*        (2006.01)

(52) U.S. Cl.
CPC .... *G02F 1/133308* (2013.01); *G02F 2201/503* (2013.01); *G02F 2001/133311* (2013.01); *G02F 2201/50* (2013.01)
USPC ... 455/575.1; 455/566; 277/645; 361/679.01; 361/679.21

(58) Field of Classification Search
USPC ........... 455/566, 575.1; 277/645; 361/679.01, 361/679.21
See application file for complete search history.

(56) References Cited

U.S. PATENT DOCUMENTS

| | | | |
|---|---|---|---|
| 2006/0140439 A1 | 6/2006 | Nakagawa | |
| 2007/0277659 A1* | 12/2007 | Schneider et al. | ................ 83/73 |
| 2009/0054115 A1* | 2/2009 | Horrdin et al. | ............. 455/575.8 |
| 2009/0165843 A1* | 7/2009 | Horioka et al. | ............... 136/251 |
| 2009/0262424 A1 | 10/2009 | Shi et al. | |

FOREIGN PATENT DOCUMENTS

| | | | |
|---|---|---|---|
| JP | 61-137494 | 6/1986 | |
| JP | 11270244 A * | 10/1999 | ............... E06B 3/82 |

OTHER PUBLICATIONS

International Search Report and Written Opinion of corresponding International Application No. PCT/IB2011/000396, dated Jul. 5, 2011.
International Preliminary Report on Patentability, corresponding to PCT/IB2011/000396, filed Feb. 24, 2011.

* cited by examiner

*Primary Examiner* — Steven Kelley
(74) *Attorney, Agent, or Firm* — Renner, Otto, Boisselle & Sklar, LLP.

(57) ABSTRACT

A protective gasket for a display module of a portable electronic device and a method for assembling the device. The electronic device includes a housing frame, a main body having a display module, and a flexible gasket between the frame and main body, the frame having a display window corresponding to the display module. A cut is at corner portions of the gasket so that inner edges of the flexible gasket are bent after the display module is embedded into the display window, and then compressed and fitted between the outer periphery of the display module and the inner periphery of the display window. With the inner edges of the flexible gasket bent, the thickness of the electronic device can be reduced, and the periphery of the display module can be protected. The display module also can be protected from intrusion by foreign matters such as dust and moisture.

4 Claims, 6 Drawing Sheets

PROTECTIVE GASKET FOR DISPLAY MODULE OF PORTABLE ELECTRONIC DEVICE AND METHOD FOR ASSEMBLING THE DEVICE

FIELD OF THE INVENTION

The present invention relates to a protective gasket for a display of a portable electronic device, and more particularly, to a flexible gasket to be disposed between a housing and a display module such as a liquid crystal display (LCD) module for protecting the display module, a portable electronic device including the flexible gasket and a method for assembling the portable electronic device.

BACKGROUND OF THE INVENTION

Presently various portable electronic devices, such as mobile phone, MP4 and personal digital assistant (PDA), are more and more popular due to their increasing functions. These portable electronic devices are also thinner and thinner for the convenience of carrying carriage by people.

For example, in a current mobile phone, a gasket is usually disposed between a housing and a display module such as an LCD module to avoid any damage to the display module caused by a collision, e.g., as by bumping, dropping, hitting, hard pressing, and so on. As illustrated in FIG. 1, a transparent protective film 110 on the housing is adhered with a gasket 120 having a certain thickness. Thus, when a main body of the mobile phone having the display module is mounted with the housing together, the gasket 120 is disposed between the transparent protective film 110 and the LCD module 130 to serve as a cushion material, as illustrated in FIG. 2. FIG. 2 is a section diagram taken along line A-A' of FIG. 1. It shall be particularly pointed out that FIGS. 1 and 2 only schematically illustrate portions related to a gasket mounting arrangement.

In such an arrangement, the gasket 120 occupies a part of the entire thickness of the mobile phone, which is a negative factor for a design that intends to reduce the thickness. In addition, the gasket 120 can only avoid the damage to the LCD module caused by a collision perpendicular to the display surface of the LCD module, while it cannot protect the side surfaces of the LCD module.

SUMMARY OF THE INVENTION

Thus, in view of the above problem in the prior art, the present invention provides a protective gasket for a display for use in a portable electronic device, wherein after the portable electronic device is assembled, the inner edges of the gasket can be bent and compressed and fitted between a housing frame and a side periphery of a LCD module of the portable electronic device. The present invention further provides a portable electronic device including the gasket and a method for assembling the portable electronic device.

A first aspect of the invention provides a portable electronic device including a housing frame, a main body having a display module, and a flexible gasket disposed between the housing frame and the main body, the housing frame having a display window portion corresponding to the display module, wherein, the flexible gasket has a cut portion at each of corner portions thereof, so that each of inner edges of the flexible gasket is bent as and/or after the display module is embedded into the display window portion, and then compressed and fitted between the outer periphery of the display module and the inner periphery of the display window portion.

A second aspect of the invention provides a portable electronic device based on the first aspect, wherein, the cut portion at each of the corner portions of the flexible gasket is a linear cut portion that extends from the inner corner point of the corner portion to a position in the diagonal direction, so that the bending amount of the inner edge of the flexible gasket is corresponding to a predetermined length.

A third aspect of the invention provides a portable electronic device based on the second aspect, wherein, the predetermined length corresponding to the bending amount of the inner edge of the flexible gasket is determined based on a side mounting height of the display module.

A fourth aspect of the invention provides a portable electronic device based on the first aspect, wherein, the housing frame includes a concave portion for accommodating the flexible gasket, and the step height of the concave portion is corresponding to thickness of the flexible gasket.

A fifth aspect of the invention provides a portable electronic device based on the first aspect, wherein, the portable electronic device is a mobile phone.

A sixth aspect of the invention provides a method for assembling a portable electronic device, including:

preparing a housing frame and a main body having a display module of the portable electronic device, the housing frame having a display window portion corresponding to the display module;

preparing a flexible gasket mounting assembly that includes a carrying substrate and a flexible gasket adhered thereto, the flexible gasket having a cut portion at each of corner portions thereof;

aligning and pressing the flexible gasket mounting assembly towards the display window portion included in the housing frame, in a way that the flexible gasket faces the housing frame, so that the flexible gasket is bonded to corresponding position of the display window portion, and subsequently removing the carrying substrate; and attaching the main body onto the housing frame so as to embed the display module into the display window portion included in the housing frame, so that each of the inner edges of the flexible gasket is bent and compressed and fitted between the outer periphery of the display module and the inner periphery of the display window portion.

A seventh aspect of the invention provides a method based on the sixth aspect, wherein, the process of preparing the flexible gasket mounting assembly includes:

providing the carrying substrate; and adhering a rectangular flexible gasket onto the carrying substrate, and cutting a cut portion at each of the four corner portions of the flexible gasket along diagonal directions.

An eighth aspect of the invention provides a method based on the seventh aspect, wherein, the cut portion is a linear cut portion, which is formed by cutting the flexible gasket over a portion extending from the inner corner point of the respective corner portion to a position in the diagonal direction, which is positioned so that the bending amount of the inner edge of the flexible gasket is corresponding to a predetermined length.

A ninth aspect of the invention provides a method based on the eighth aspect, wherein, the predetermined length corresponding to the bending amount of the inner edge of the flexible gasket is determined based on a side mounting height of the display module.

A tenth aspect of the invention provides a flexible gasket to be disposed between a housing frame and a display module of a portable electronic device to protect the display module, the flexible gasket being shaped into a hollow rectangle, wherein the flexible gasket has a cut portion at each of corner portions thereof, so that each of inner edges of the flexible gasket can be bent after the display module is embedded into a display window portion included in the housing frame, and then compressed and fitted between the outer periphery of the display module and the inner periphery of the display window portion.

An eleventh aspect of the invention provides a flexible gasket based on the tenth aspect, wherein, the cut portion at each of the corner portions of the flexible gasket is a linear cut portion that extends from the inner corner point of the corner portion to a position in the diagonal direction, so that the inner edge of the flexible gasket can be bent by a mount corresponding to a predetermined length.

A twelfth aspect of the invention provides a flexible gasket based on the eleventh aspect, wherein, the predetermined length corresponding to the bending amount of the inner edge of the flexible gasket is determined based on a side mounting height of the display module.

According to an aspect of the invention, as the inner edges of the flexible gasket can be bent after the portable electronic device is assembled, the thickness of the portable electronic device can be reduced, and the side periphery of the display module can be protected.

According to another aspect of the invention, the display module of the portable electronic device can be protected better from being intruded by foreign matters such as dust and moisture.

These and further aspects and features of the present invention will be apparent with reference to the following description and attached drawings. In the description and drawings, particular embodiments of the invention have been described in detail as being indicative of some of the ways in which the principles of the invention may be employed, but it is appreciated that the invention is not limited thereto in scope. Rather, the invention intends to cover all changes, modifications and equivalents coming within the spirit and terms of the appended claims.

Features that are described and/or illustrated with respect to one embodiment may be used in the same way or in a similar way in one or more other embodiments and/or in combination with or instead of the features of the other embodiments.

It should be emphasized that the term "include(s)/including" and "comprise(s)/comprising" when used in this specification is taken to specify the presence of stated features, integers, steps or components but does not preclude the presence or addition of one or more other features, integers, steps, components or groups thereof.

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated in size, e.g., made larger in relation to other parts than in an exemplary device actually made according to the invention. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

BRIEF DESCRIPTION OF THE DRAWINGS

The drawings are included to provide further understanding of the present invention, which constitute a part of the specification and illustrate embodiments of the present invention, and are used for setting forth the present invention together with the description. The same element is represented with the same reference number throughout the drawings.

In the drawings.

DESCRIPTION

The interchangeable terms "electronic apparatus" and "electronic device" include portable radio communication apparatus. The term "portable radio communication apparatus", which hereinafter is referred to as a "mobile terminal", "portable electronic device", or "portable communication device", includes all apparatuses such as mobile telephones, pagers, communicators, electronic organizers, personal digital assistants (PDAs), smart phones, portable communication devices or the like.

In the present application, embodiments of the invention are described primarily in the context of a portable electronic device in the form of a mobile telephone (also referred to as "mobile phone"). However, it shall be appreciated that the invention is not limited to the context of a mobile telephone and may relate to any type of appropriate electronic apparatus.

The present invention is described as follows in reference to the drawings.

Figure 3:
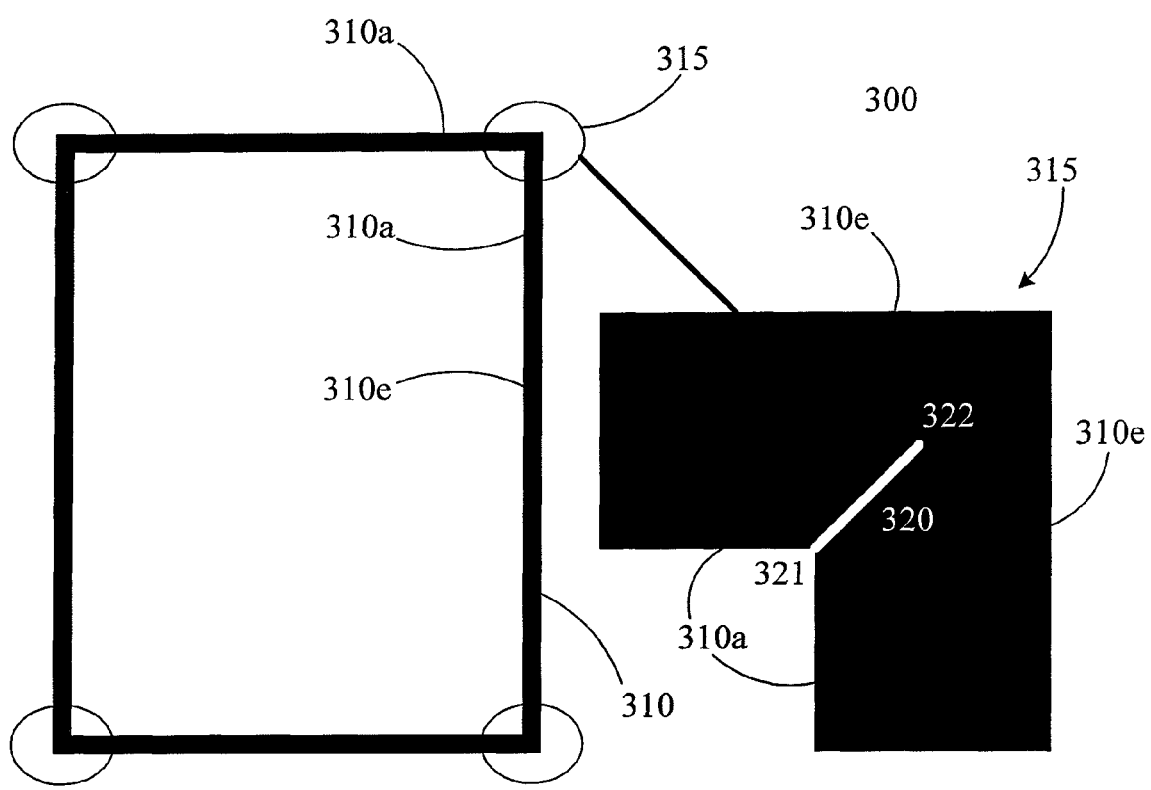
FIG. 3 is a plan view that illustrates the structure of a protective gasket for an LCD module according to an embodiment of the present invention.

FIG. 3 is a plan view 300 that illustrates a flexible gasket 310 for a display module (for example, an LCD module) for use in a mobile phone according to an embodiment of the present invention. The right portion in the view is an enlarged view of a corner portion 315 of the flexible gasket 310, which is shown in the left portion of the drawing surrounded with an elliptical mark. The other corner portions of the flexible gasket 310 also are shown by elliptical markings and may be similar to the corner portion that is illustrated at 315. Herein, the description is made with the LCD module as an example. However, it is appreciated that the invention is not limited thereto. For example, the invention may also be applicable to a mobile phone including an LED module or some other type of display module.

As illustrated in FIG. 3, the flexible gasket 310 is generally in a hollow (or annular) rectangular shape, for example, and has a cut portion 320 at each of the four corner portions thereof similar to the corner portion 315. As an example, the flexible gasket 310 is formed with a flexible foam material, and an adhesive is applied to one side of the flexible gasket 310 so as to adhere the flexible gasket 310 to the housing frame of the mobile phone.

The cut portion 320 may be formed by partially cutting the corner portion 315 in a diagonal direction relative to the right angle or other angle junction of adjacent extending lengths 310a, e.g., arms or sides, of the flexible gasket 310. Although the cut portion 320 shown in the drawing is a simple cut slit (e.g., a linear cut portion), a cut portion of a different shape (e.g., curved shape) may also be possible as may be desired. The slit width of the cut slit 320 can be provided so that two inner edges adjacent to the cut slit 320 can be easily bent, for example, the slit width may be corresponding to that of the flexible gasket 310, e.g., corresponding to the installed axial thickness or length "T" of the flexible gasket in the direction of axis A shown in FIG. 4F. The cut slit 320 extends from an inner corner point 321 of the corner portion 315 to a position 322 in the diagonal direction. The position 322 is positioned so that the bending amount of the inner edge of the flexible gasket 310 is corresponding to a predetermined length after the mobile phone is assembled, e.g., the predetermined length is determined based on a side mounting height of the LCD module of the mobile phone, and preferably, may be substantially equal to the side mounting height of the LCD module.

Thus, after the flexible gasket 310 is disposed onto a display window portion of the housing frame of the mobile phone, and the LCD module of the mobile phone is embedded into the display window portion of the housing frame, the inner edge 310e of the flexible gasket 310 which is corresponding to the cut slit portion 320 will be bent, and then compressed and fitted between the outer periphery of the LCD module and the inner periphery of the display window portion.

Various assembly phases of the mobile phone according to an embodiment of the present invention are described as follows in reference to FIGS. 4A-4F.

Figure 1:
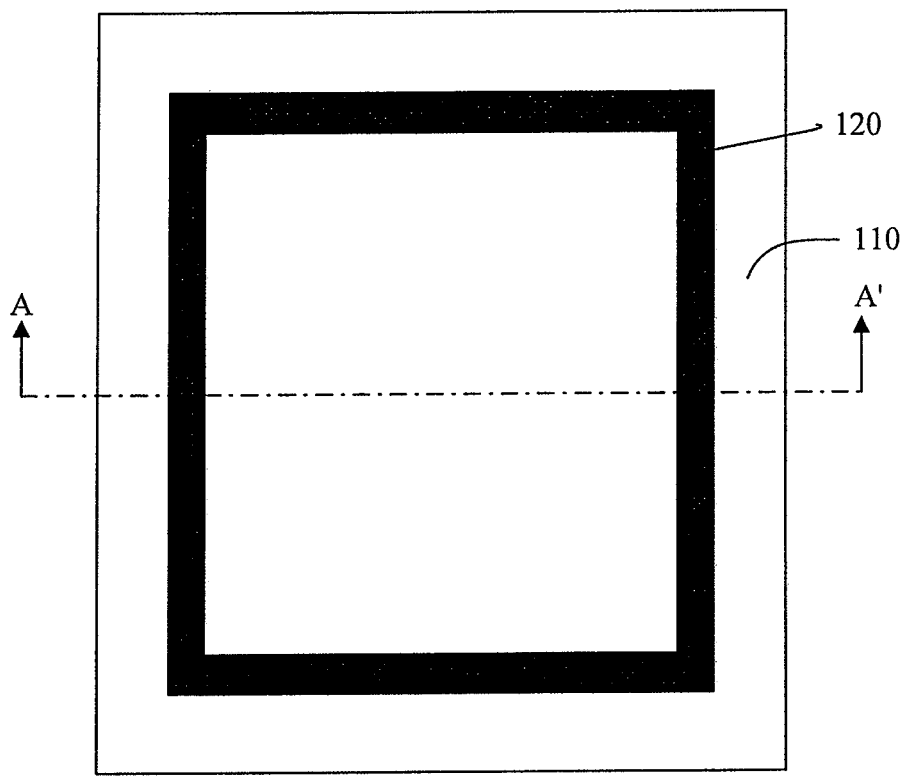
FIG. 1 is a plan view that illustrates a display window protective film to which a conventional LCD module gasket is attached.
Figure 2:
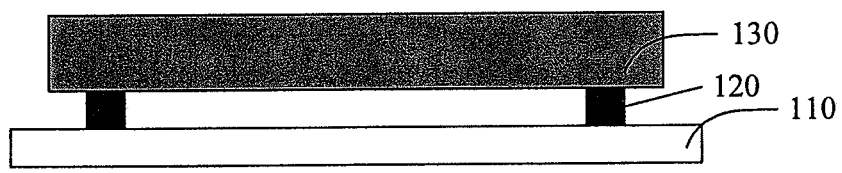
FIG. 2 is a sectional view taken along Line A-A' in FIG. 1 and illustrating the overlapping relations between the LCD module, the gasket and the display window protective film after the device is assembled.
Figure 4A:
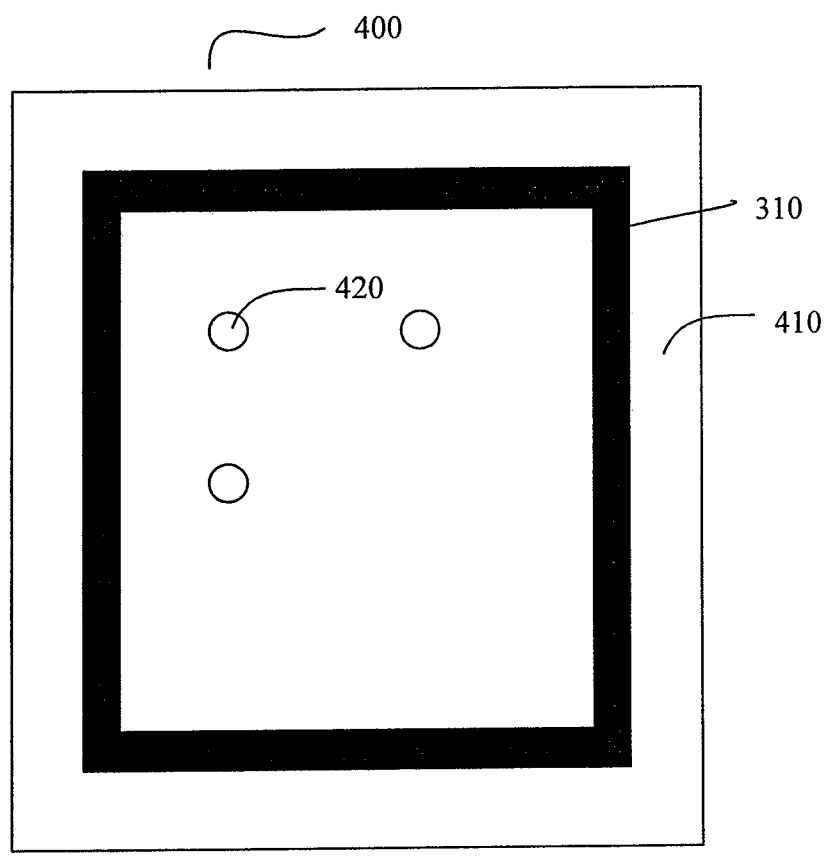
FIG. 4A-4F are views that illustrate respective assembly phases according to an embodiment of the present invention.

FIG. 4A is a plan view that illustrates an example of a prepared flexible gasket mounting assembly. The flexible gasket mounting assembly 400 includes a carrying substrate 410 and a flexible gasket 310 adhered thereto as illustrated in FIGS. 1 and 2. The carrying substrate 410 may be provided with a plurality of (for example, in this embodiment is 3, but not limited thereto) locating holes 420 for locating during the assembly procedure. Due the assembling operation, for example, the locating holes 420 can be utilized by a robot to grasp the flexible gasket mounting assembly 400 and align it with a housing frame to be assembled. For example, the carrying substrate 410 may be made of a transparent plastic film. An adhesive for bonding the carrying substrate 410 with the flexible gasket 310 thereon may be initially applied on the carrying substrate 410, or initially applied on the flexible gasket 310. The other side of the flexible gasket 310 is applied with adhesive to adhere the flexible gasket 310 to the housing frame of the mobile phone. In an embodiment the bonding force of the adhesive between the carrying substrate 410 and the flexible gasket 310 is smaller than that between the other side of the flexible gasket 310 and the housing frame of the mobile phone, so that the carrying substrate 410 can be removed after the flexible gasket 310 is attached to the housing frame.

Furthermore, the flexible gasket 310 herein has been formed with the cut portions 320 before being attached to the carrying substrate 410. Alternatively, cut portions of a predetermined shape may be formed by cutting the flexible gasket 310 and the carrying substrate 410 after the flexible gasket 310 is attached to the carrying substrate 410.

Figure 4B:
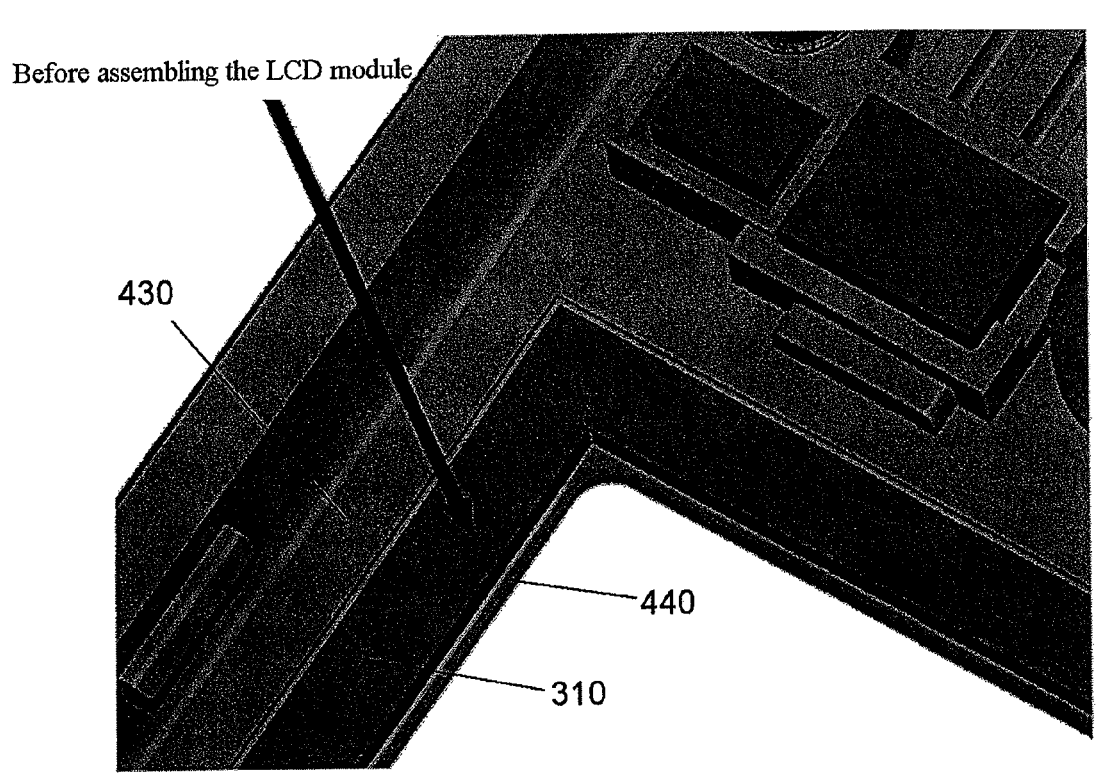
Figure 4C:
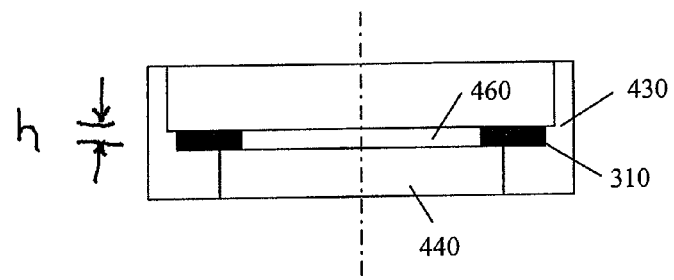

FIG. 4B illustrates a diagram in a state that the flexible gasket 310 is attached to a housing frame 430 of the mobile phone and before the LCD module is assembled. The flexible gasket mounting assembly 400 (FIG. 4A) is aligned and pressed towards a display window portion 440 included in the housing frame 430, in a way that the flexible gasket 310 side faces the housing frame 430 of the mobile phone, so that the flexible gasket 310 is bonded to corresponding position of the display window portion 440. Subsequently, the carrying substrate 410 is removed and only the flexible gasket 310 is left at the display window portion 440 of the housing frame 430. FIG. 4C illustrates a sectional view taken along the transverse direction of the mobile phone in such assembly state. As shown in FIG. 4C, the housing frame 430 includes a concave portion 460 for accommodating the flexible gasket 310, and the step height "h" of the concave portion 460 may be corresponding to thickness of the flexible gasket 310, for example. Alternatively, the concave portion 460 may also not to be provided.

Figure 4D:
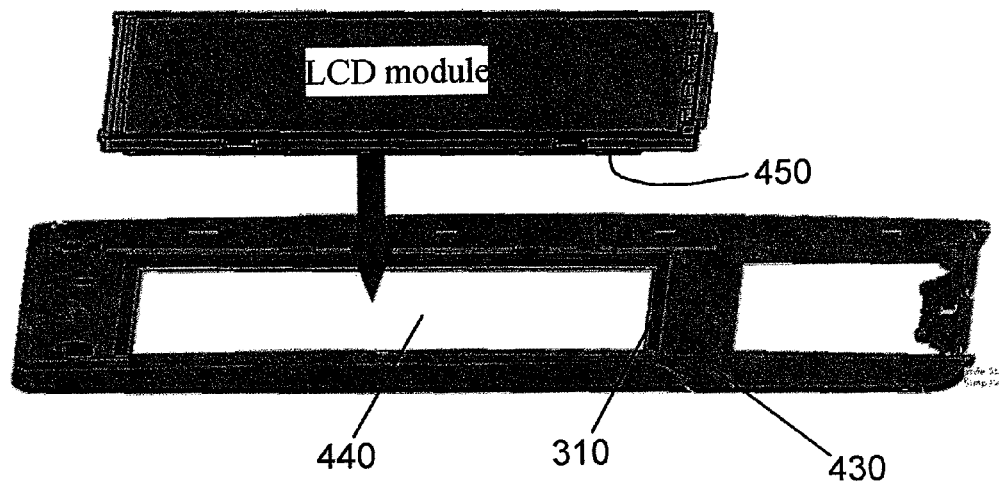

Next, as illustrated in FIG. 4D, a main body of the mobile phone including an LCD module 450 is attached to the housing frame 430, so that the LCD module 450 is embedded into the display window portion 440 of the housing frame 430.

Figure 4E:
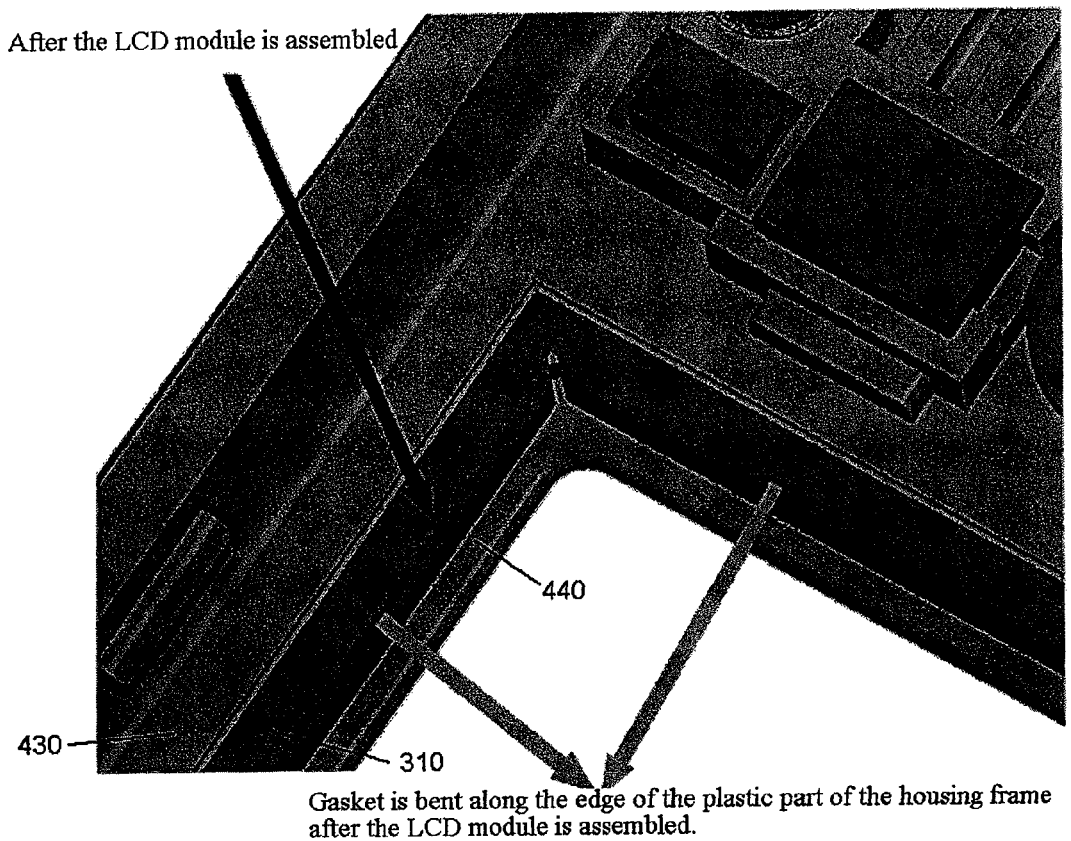

As illustrated in FIG. 4E, after the LCD module 450 is assembled, since the flexible gasket 310 has the cut portion at each corner portion, each inner edge of the flexible gasket 310 will be bent and then compressed and fitted between the outer periphery of the LCD module 450 and the inner periphery of the display window portion 440.

Figure 4F:
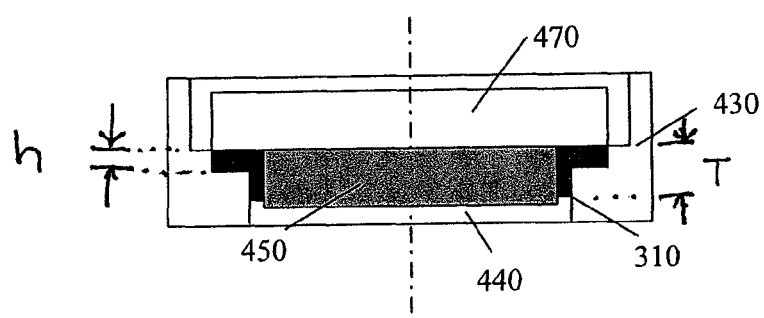

FIG. 4F is a sectional view illustrating the relationship of the positions among the LCD module 450, the bent flexible gasket 310 and the display window portion 440 in the housing frame 430 of the mobile phone in the assembling state. As mentioned above, this drawing is not depicted to scale in accordance with the dimension of real components and shows no further structural feature of the mobile phone. The drawing is made to show the relationship of the positions of the components related to the embodiments of the invention. In the drawing, reference number "470" is utilized to indicate a circuit board portion integrated with the LCD module 450 of the mobile phone.

Compared to the conventional gasket, the flexible gasket 310 of the invention disposed between the housing frame 430 and the LCD module 450 does not need to occupy the entire width of the mobile phone, which is beneficial to reduce the thickness of the mobile phone, and can provide protection to the side periphery of the LCD module 450, since its inner edges can be bent.

In addition, with the present invention, the LCD module of the portable electronic device can be protected better from being intruded by foreign matters such as dust and moisture.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A portable electronic communication device, comprising:

a housing frame, the housing frame having a display window portion corresponding to a display screen module, the display window portion comprising a recess or void in the housing frame, and wherein the housing frame further comprises a recessed portion for accommodating a hollow flexible gasket;

a main body having a display screen module; and a hollow flexible gasket disposed between the housing frame and the display screen module, wherein, the hollow flexible gasket has a cut portion at each of corner portions thereof, so that each of inner edges of the hollow flexible gasket is bent to surround the display screen module as the display screen module is embedded into the display window portion of the housing frame, and the hollow flexible gasket is compressed and fitted between the outer lateral surface of the display screen module and the inner lateral surface of the display window portion of the housing frame, wherein the cut portion at each of the corner portions of the hollow flexible gasket includes a linear cut portion of a predetermined length that extends from the inner corner point of the corner portion to a position in the diagonal direction, so that the bending amount of the inner edge of the hollow flexible gasket corresponds to the predetermined length and a side mounting height of the display screen module.

2. The portable electronic communication device according to claim 1, wherein the step height of the recessed portion of the housing frame corresponds to thickness of the flexible gasket.

3. The portable electronic communication device according to claim 1, wherein, the portable electronic communication device is a mobile phone.

4. A hollow flexible gasket to be disposed between a housing frame and a display screen module of a portable electronic communication device to protect the display screen module, the hollow flexible gasket being shaped into a hollow rectangle, wherein:

the hollow flexible gasket has a cut portion at each of corner portions thereof, so that each of inner edges of the hollow flexible gasket are configured to be bent to surround the display screen module after the display screen module is embedded into a display window portion of the housing frame, and the hollow flexible gasket is configured to be compressed and fitted between the outer lateral surface of the display screen module and the inner lateral surface of the display window portion of the housing frame; and the cut portion at each of the corner portions of the hollow flexible gasket includes a linear cut portion of a predetermined length that extends from the inner corner point of the corner portion to a position in the diagonal direction, so that the inner edge of the flexible gasket is configured to be bent by an amount corresponding to the predetermined length and a side mounting height of the display screen module.

* * * * *